United States Defensive Publication [19] (H) [11] T959,006

Suggs et al. [43] June 7, 1977

[54] CURING SYSTEM FOR UNSATURATED MATERIALS

[76] Inventors: James L. Suggs, Rte. 12, Greeneville, Tenn. 37743; William W. Blount, Jr., 1129 Oak Leaf Drive, Kingsport, Tenn. 37663

[21] Appl. No.: 701,254

[22] Filed: June 30, 1976

[51] Int. Cl.[2] ..... C08F 4/26

[52] U.S. Cl. ..... 526/14; 526/15; 526/16; 526/47; 526/49; 526/271; 526/272; 255/431 C

[57] ABSTRACT

This invention concerns novel curing systems useful for curing unsaturated polyester/monomer mixtures such as the polyester of propylene glycol, phthalic anhydride and maleic anhydride, with styrene as the monomer. The curing system is the complex formed by the reaction of (1) a cobalt compound, such as $Co(OH)_2$ or $CoCO_3$ (2) and acid of the formula

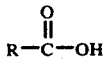

wherein R is a straight or branched alkyl of 1–20 carbons which may be monosubstituted with hydroxyl, aryl of 6–10 ring carbons and cycloaliphatic of 6–10 ring carbons, and (3) a nitrogen component of the formula

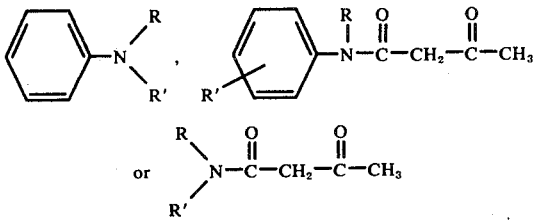

wherein R and R′ are independently selected from straight and branched alkyl of 1–10 carbon atoms which may be monosubstituted with hydroxyl. The acid residue in the complex comprises from about 0.2 to about 20.0% by weight of said complex, the cobalt compound, as percent cobalt metal, from about 0.1 to about 10.0% by weight, and the nitrogen compound residue from about 65 to about 90% by weight. The complex is prepared, for example, by mixing the components and heating for at least about one hour from about 100° C to about 200° C.

3 Claims, No Sheets Drawing,

11 Pages Specification

The file of this unexamined application may be inspected and copies thereof may be purchased (849 O.G. 1221, Apr. 9, 1968).